US012679767B2

(12) United States Patent
Savage et al.

(10) Patent No.: US 12,679,767 B2
(45) Date of Patent: Jul. 14, 2026

(54) COATED GLASS PANE

(71) Applicant: Pilkington Group Limited, Lathom (GB)

(72) Inventors: Philip Savage, Lathom (GB); John Buckett, Tarporley (GB); Charlie James Patrickson, Exeter (GB)

(73) Assignee: Pilkington Group Limited, Lathom (GB)

( * ) Notice: Subject to any disclaimer, the term of this patent is extended or adjusted under 35 U.S.C. 154(b) by 303 days.

(21) Appl. No.: 18/292,367

(22) PCT Filed: Jul. 27, 2022

(86) PCT No.: PCT/GB2022/051963
§ 371 (c)(1),
(2) Date: Jan. 26, 2024

(87) PCT Pub. No.: WO2023/007153
PCT Pub. Date: Feb. 2, 2023

(65) Prior Publication Data
US 2024/0368030 A1 Nov. 7, 2024

(30) Foreign Application Priority Data

Jul. 28, 2021 (GB) ..................................... 2110849

(51) Int. Cl.
*B32B 15/04* (2006.01)
*B32B 17/06* (2006.01)
(Continued)

(52) U.S. Cl.
CPC .... *C03C 17/3618* (2013.01); *B32B 17/10091* (2013.01); *B32B 17/10229* (2013.01);
(Continued)

(58) Field of Classification Search
CPC ........................ C03C 17/3642; C03C 17/3618
(Continued)

(56) References Cited

U.S. PATENT DOCUMENTS 5,110,637 A * 5/1992 Ando ................... C03C 17/3657
428/428
8,105,695 B2 * 1/2012 Depauw .............. C03C 17/3639
428/432
(Continued)

FOREIGN PATENT DOCUMENTS

CN 110325484 B 5/2022
CN 118339023 A 7/2024
(Continued)

OTHER PUBLICATIONS

United Kingdom Intellectual Property Office, Search Report in Application No. GB2110849.3, dated Jan. 24, 2022.
(Continued)

*Primary Examiner* — Lauren R Colgan
(74) *Attorney, Agent, or Firm* — Marshall & Melhorn, LLC

(57) ABSTRACT

The present invention relates to a coated glass pane, a method of producing a coated glass pane, a multiple glazing comprising a coated glass pane and a use of a coated glass pane and/or multiple glazing in a building or vehicle. The coated glass pane includes a glass substrate and a coating suitable for reflecting infra-red radiation. The coating includes a base layer including an oxide of zirconium and titanium $Zr_xTi_yO_z$ and the atomic proportion of Zr based on Zr and Ti in the base layer, calculated as x/(x+y), is from 0.40 to 0.95.

24 Claims, 4 Drawing Sheets

(51) Int. Cl.
    *B32B 17/10*         (2006.01)
    *C03C 17/36*        (2006.01)

(52) U.S. Cl.
    CPC ...... *C03C 17/3639* (2013.01); *C03C 17/3642*
        (2013.01); *C03C 17/3644* (2013.01); *B32B*
      *2255/205* (2013.01); *B32B 2255/28* (2013.01);
        *B32B 2311/08* (2013.01); *B32B 2311/18*
      (2013.01); *B32B 2311/20* (2013.01); *C03C*
    *2203/52* (2013.01); *C03C 2217/216* (2013.01);
        *C03C 2217/228* (2013.01); *C03C 2217/256*
                                  (2013.01)

(58) Field of Classification Search
    USPC ......................................... 428/426, 432, 434
    See application file for complete search history.

(56) References Cited

U.S. PATENT DOCUMENTS

| | | | | |
|---|---|---|---|---|
| 10,213,988 | B2 * | 2/2019 | Zhang | C03C 17/366 |
| 11,267,753 | B2 * | 3/2022 | Maillet | C03C 17/3649 |
| 2010/0167034 | A1 * | 7/2010 | Depauw | C03C 17/3681 |
| | | | | 428/432 |
| 2011/0027562 | A1 * | 2/2011 | Di Stefano | C03C 17/3618 |
| | | | | 204/192.15 |
| 2014/0087160 | A1 * | 3/2014 | McSporran | G02B 1/115 |
| | | | | 204/192.1 |
| 2017/0362121 | A1 * | 12/2017 | Maillet | C03C 17/3652 |
| 2018/0003394 | A1 * | 1/2018 | Urien | C03C 17/3686 |
| 2018/0029930 | A1 * | 2/2018 | Lorenzzi | C03C 17/3639 |
| 2018/0252027 | A1 * | 9/2018 | Ding | C03C 17/3644 |
| 2019/0375677 | A1 * | 12/2019 | Boyce | C09D 1/00 |
| 2019/0375678 | A1 * | 12/2019 | Boyce | G02B 1/002 |
| 2019/0377115 | A1 * | 12/2019 | Boyce | C03C 17/3636 |

FOREIGN PATENT DOCUMENTS

| | | | |
|---|---|---|---|
| EP | 2262736 | A1 | 12/2010 |
| EP | 3237348 | A1 | 11/2017 |
| EP | 3738942 | A1 | 11/2020 |
| WO | 2008113786 | A1 | 9/2008 |
| WO | 2019239312 | A1 | 12/2019 |
| WO | 2020208228 | A1 | 10/2020 |
| WO | 2022253692 | A1 | 12/2022 |
| WO | 2024096741 | A1 | 5/2024 |

OTHER PUBLICATIONS

European Patent Office, International Search Report and Written Opinion in Application No. PCT/GB2022/051963, dated Oct. 6, 2022, 8 pages, Rijswijk, Netherlands.

* cited by examiner

COATED GLASS PANE

BACKGROUND OF THE INVENTION

The present invention relates to a coated glass pane, in particular a coated glass pane comprising a glass substrate and a coating. The invention also relates to a method of manufacturing said coated glass pane.

There is a continual demand from the glass manufacturing industry for coated glass substrates which are able to meet the demanding performance requirements of automotive and architectural glazing. Such glazings must conform to the required standards of safety and energy efficiency, be shaped to conform to the physical and aesthetic requirements of the structure in which they are placed and fulfil their primary function of light transmission. It is also desirable that such glazings are of a pleasant colour in terms of transmission and/or reflection.

The requirement that glazings improve the energy efficiency of the structure in which they are placed is often met through the use of coatings. Glass coatings which provide low-emissivity (low-e) and/or solar control may be used to selectively absorb or reject light. Low-emissivity and solar control coating stacks are commonly made up of repeat sequences of for example:

'substrate/dielectric layer sequence/[silver (Ag) layer/dielectric layer sequence]$_n$', with each of the layers not necessarily having the same thicknesses or composition as another. It is becoming more common in the glass manufacturing industry for 'n' in the sequence above to equal 2, 3, 4 or even 5 or more, allowing the production of coatings comprising 2, 3, 4, or even 5 or more silver layers. Such coatings may be deposited for example by physical vapour deposition processes, such as sputtering.

In order to provide glazings meeting the required safety standards, glass panes are often submitted to thermal strengthening, in which the glass panes are heated to temperatures near or above the softening point of the glass, and then to rapidly cooled to impart stresses in the glass panes. Glass panes may be strengthened to provide varying degrees of stress, and therefore higher or lower strengths, as required.

Similarly, in order to provide glazings which conform to the required shape, glass panes are often submitted to thermal bending, in which the glass panes are heated to temperatures near or above the softening point of the glass, and then bent with the aid of suitable bending means.

In some cases, simultaneous bending and strengthening processes may be used. Such processes for altering the shape and/or properties of the glass pane using heat are known as "heat treatments".

Many glazings comprise soda lime silica glass, which is often produced using a float process. The strengthening or bending of standard float glass of the soda lime silica type is typically achieved by heating the glass to temperatures in the region of 580 to 690° C., during which time the glass panes are kept at this temperature range for several minutes before initiating the actual toughening and/or bending process.

As such, the term "heat treatment", in the following description and in the claims refers to thermal processes such as bending and/or thermal strengthening during which a coated glass pane reaches temperatures in the range of 580 to 690° C. for at least 5 minutes. A glass pane that has undergone such a treatment is referred to as "heat treated".

Coated glass panes may also be submitted to strengthening and bending processes. However, coated glass panes are often incompatible with heat treatments, and may be damaged by the process. Typical damage to coated glass panes caused by heat treatments may be indicated by increased haze (often perceived as cloudiness), pinholes and spots. The function of the glazing may also be impaired, resulting in a decrease in light transmission and/or a reduction in the effectiveness of the low-emissivity coating, exemplified by an increase in sheet resistance values. As such, a coated glass pane that is damaged by heat treatment may be unacceptable due to its appearance and/or its reduced functional ability. A coated glass pane that exhibits such damage upon heat treatment is known as "non-heat treatable". Conversely, a coated glass pane is deemed to be "heat treatable" if it survives a heat treatment without significant damage.

Therefore, it is desirable to produce "heat treatable" coated glass panes.

In addition, it is common that glazing installations, such as for example facades, vehicles or windows, incorporate some glazing sheets that are not heat treated, or are not heat treated to the same extent. In particular, some glazing sheets that are strengthened and/or bent may be situated alongside glazing sheets which are not strengthened and/or bent, or not strengthened and/or bent to the same extent. For example, in a glazing installation there may be a requirement for lower panes, which occupants may come into contact with, to be strengthened by heat treatment, while upper panes may be only annealed and therefore less expensive. In addition, regulations may require glazings in tall buildings to be strengthened by heat treatment to reduce the risk of breakage and falling glass. Where this is the case, it is important that the colour and transparency of strengthened sheets are not markedly dissimilar to annealed sheets, to prevent the installation from having an aesthetically undesirable "chequerboard" effect. This may be brought about using products supplied as annealed and heat treated pairs, wherein the heat treated product is optically similar to the annealed product. Therefore, it is important to be able to carefully control the optical properties of the coated glazing upon submission to heat treatment.

In some cases, it is advantageous that a coated glazing material, as well as being heat treatable, also exhibits only negligible changes in its colour and transparency after being submitted to a heat treatment process when values are compared before and after heat treatment process. A coating which exhibits only negligible changes in its colour and transparency after being submitted to a heat treatment process when values are compared before and after the heat treatment process may be supplied in place of a pair of annealed and heat treated products and is therefore said to be a "single stock" coating. In particular, coatings which exhibit a $\Delta E^*$ value of less than 3 are considered to be suitable for single stock applications. Alternatively to measuring values before and after the heat treatment process, values may be compared between comparable coated glass panes with the same composition and coating composition where a first coated glass pane is annealed a second coated glass pane has been heat treated.

It is known that the coating layer adjacent to the glass substrate, often referred to as the "base layer" plays a key role in determining the product performance. It is thought that this is because the coating layer adjacent to the glass substrate is a key interface between the surface of the substrate and the coating and must adhere the coating to the substrate. The coating layer adjacent to the glass surface also prevents diffusion of sodium from the bulk glass into the coating—such sodium is thought to reduce the performance of noble metal infra-red reflecting layers. Sodium diffusion is thought to be exacerbated by heat treatment processes.

Previous functional coatings have included layers of $TiO_x$ as a base layer. The use of $TiO_x$ as a base layer allows the production of attractive blue/green reflection colours, without a compromise in IR reflectivity. However, it has been found that coated glazings with $TiO_x$ base layers exhibit unacceptable damage following heat treatment. It is thought that $TiO_x$ layers do not form a sufficient barrier to the migration of sodium ions. As such, in the past coatings that comprise a $TiO_x$ containing layer adjacent to the glass surface have been considered to be "non-heat treatable".

Previous attempts at heat treatable coatings have included layers of $SiN_x$ adjacent to the glass surface. However, $SiN_x$ does not provide such beneficial aesthetic properties when compared to $TiO_x$. This results in $SiN_x$ being used as the base layer for toughenable coatings, and $TiO_x$ being used for non-toughenable coatings, increasing the complexity of the manufacturing process and requiring changes to the manufacturing facility to switch between the apparatus required to deposit $TiO_x$ and $SiN_x$. Such changes may necessitate 2 to 3 days of downtime, which is costly.

Alternative compositions for base layers have been investigated. For example, US20190203529 A1 discloses a functional building material for a window that includes a transparent glass substrate and a low-emissivity coating formed on the transparent glass substrate. The low-emissivity coating includes a vertical sequential stack on the transparent glass substrate that includes a lower barrier layer, and the lower barrier layer may include a first metal, a first complex metal, a first metal oxide, a first complex metal oxide, a first metal oxynitride, a first complex metal oxynitride, and a combination thereof.

Similarly, WO 2008113786 A1 discloses a glazing coated with a set of thin vacuum-deposited layers. The glazing includes one or more silver-based layers and dielectric layers, wherein at least one dielectric layer underlying at least one silver-based layer is a layer containing titanium oxide or oxinitride of the $TiMO_x$ or $TiMO_xN_y$ type.

However, there still remains a need for a heat treatable coated glass pane with improved colour performance, transparency and low-emissivity performance.

SUMMARY OF THE INVENTION

Therefore, the aim of the present invention is to provide improved heat treatable, substantially transparent, low-emissivity coated glass panes.

The invention furthermore aims to provide heat treatable coated glass panes which either have a high light transmittance and a low emissivity (corresponding to a low sheet resistance) and/or which show good solar control properties, that is, the glass panes have a low solar energy transmittance combined with a sufficiently high light transmittance.

In addition, in some cases, the present invention aims to provide single-stock coatings wherein the colour modification of the coated glass panes caused by a heat treatment is such that if required, heat treated and non-heat treated coated glass panes may be glazed adjacent to each other without a noticeable colour difference in use.

According to the first aspect of the present invention, there is provided a coated glass pane comprising a glass substrate and a coating, wherein the coating comprises, in sequence from the glass substrate:

a base layer adjacent to and in contact with the glass substrate;

a silver-based functional layer; and
an upper dielectric layer,
wherein:
the base layer comprises an oxide of zirconium and titanium $Zr_xTi_yO_z$; and
the atomic proportion of Zr based on Zr and Ti in the base layer, calculated as $x/(x+y)$, is from 0.40 to 0.95. The inventors have surprisingly discovered that coated glass panes including such a base layer provides an improved heat treatable coated glass pane that provides excellent infra-red reflection properties. As such, the coating is suitable for reflecting infra-red radiation. Furthermore, such a base layer provides heat treatable coated glass panes which either have a high light transmittance and a low emissivity (corresponding to a low sheet resistance) and/or which show good solar control properties, that is, the glass panes have a low solar energy transmittance combined with a sufficiently high light transmittance. Furthermore, such coated glass panes may be produced in an economically efficient and commercially desirable manner, and meet the required optical properties of the glass industry in terms of for example, haze, light transmittance and colour, and which are also robust enough to withstand thermal toughening.

Without wishing to be bound by theory, the inventors consider that the surprisingly good performance of the coated glass pane of the present invention may relate to the high sodium blocking ability of the base layer. This prevents migration of sodium from the glass substrate into the coating, which can degrade the coating's performance.

In addition, in some embodiments, coated glass panes that are suitable for single-stock application are provided by the present invention. Furthermore, some embodiments according to the present invention exhibit attractive, blue-green, colour in glass side reflection.

In addition, a base layer according to the present invention may be used to replace one or more layers within lower dielectric layers in existing coating stack designs. In particular, a $TiO_x$ base layer and/or $SiN_x$ base layer and/or other layers such as $(Zn)SnO_x$ layers in lower dielectric layers may be replaced by a base layer according to the present invention. Advantageously, a base layer according to the present invention may be of reduced thickness compared to the original layers(s), and may provide beneficial properties such as reduced haze and improved sheet resistance. Less and/or thinner layer(s) in a stack design are associated with reduced cost of materials, and may also reduce the number of coating processes required, leading to reduced capital expenditure and increased throughput.

Base Layer

As used herein, the atomic proportion of zirconium (Zr) based on zirconium and titanium (Ti) in the base layer, calculated as $x/(x+y)$, is calculated by dividing the atomic % of zirconium in the total composition by the sum of the atomic percentages of zirconium and titanium in the total composition. For example, a layer with atomic percentages Zr(20), Ti(20), O(60) has an atomic proportion of Zr of metals of 0.5.

In some embodiments, the base layer substantially consists of titanium, oxygen and zirconium with only trace amounts of other elements. According to the present invention, trace amounts of other elements refers to impurities making up in total less than 5 weight % of the base layer, preferably less than 1 weight % of the base layer.

Alternatively, the base layer comprises further elements, such as yttrium, which help to stabilise the layer. Preferably, further elements are not present in greater than 10 weight % of the base layer.

Preferably, the atomic proportion of Zr based on Zr and Ti in the base layer, calculated as $x/(x+y)$, is from 0.50 to 0.90. Preferably, the atomic proportion of Zr based on Zr and Ti in the base layer, calculated as $x/(x+y)$ is from 0.55 to 0.85. More preferably the atomic proportion of Zr based on Zr and Ti in the base layer, calculated as $x/(x+y)$, is from 0.60 to 0.80. Yet more preferably the atomic proportion of Zr based on Zr and Ti in the base layer, calculated as $x/(x+y)$, is from 0.62 to 0.67. Coated glass panes comprising base layers with such atomic proportions of Zr have particularly good heat treatment performance, as discussed herein.

Preferably, the atomic % of titanium in the base layer, calculated as Ti in the total composition, is from 1 to 25, preferably from 5 to 20, more preferably from 8 to 15.

Preferably, the atomic % of oxygen in the base layer, calculated as O in the total composition, is from 60 to 70, preferably from 62 to 66, more preferably from 63 to 65.

Preferably the atomic % of zirconium in the base layer, calculated as Zr in the total composition, is from 12 to 35, preferably from 15 to 25.

Preferably, the thickness of the base layer in nm is from 6 to 60, preferably from 8 to 45, more preferably from 10 to 30.

Preferably, the Zr factor of the base layer, calculated as the thickness of the base layer in nm multiplied by the atomic proportion of Zr based on Zr and Ti in the base layer, is from 1 to 35. More preferably, the Zr factor of the base layer, calculated as the thickness of the base layer in nm multiplied by the atomic proportion of Zr based on Zr and Ti in the base layer, is from 5 to 20. Even more preferably, the Zr factor of the base layer, calculated as the thickness of the base layer in nm multiplied by the atomic proportion of Zr based on Zr and Ti in the base layer, is from 7 to 15. Yet more preferably, the Zr factor of the base layer, calculated as the thickness of the base layer in nm multiplied by the atomic proportion of Zr based on Zr and Ti in the base layer, is from 8 to 12.

The inventors have discovered that altering the thickness and/or the composition of the base layer such that the Zr factor remains within the preferred ranges above improves the response of the coated glass pane to heat treatment. A lower Zr factor is associated with increased haze, while a higher Zr factor is associated with reduced conductivity, and/or increased haze.

Silver Functional Layers

The silver-based functional layer(s) preferably consists essentially of silver without any additive, as is normally the case in the area of low-emissivity and/or solar control coatings. It is, however, within the scope of the invention to modify the properties of the silver-based functional layer(s) by adding doping agents, alloy additives or the like or even adding very thin metal or metal compound layers, as long as the properties of the silver-based functional layer(s) necessary to function as highly light-transmitting and low light-absorbent IR-reflective layer(s), are not substantially impaired thereby.

The thickness of each silver-based functional layer is dominated by its technical purpose. For typical low-emissivity and/or solar control purposes the preferred layer thickness for a single silver-based layer may preferably be from: 5 to 20 nm; more preferably from 5 to 15 nm; even more preferably from 5 to 13 nm; even more preferably from 8 to 12 nm; most preferably from 9 to 12 nm. With such a layer thickness, light transmittance values of above 86% and a normal emissivity below 0.05 after a heat treatment may be readily achieved in accordance with the present invention for single silver coatings. If better solar control properties are required, the thickness of the silver-based functional layer may be adequately increased or several spaced functional layers may be provided as further explained below.

In some embodiments, the silver-based functional layer is in direct contact with the base layer. Preferably, when the silver-based functional layer is in direct contact with the base layer, the base layer is between 20 nm and 60 nm in thickness.

In alternative embodiments of the present invention, the coated glass pane preferably further comprises a lower dielectric layer between the base layer and the silver layer. Preferably, when the coated glass pane comprises a lower dielectric layer between the base layer and the silver layer, the base layer has a thickness from 6 nm to 25 nm.

Preferably, the lower dielectric layer has a thickness of from 20 nm to 70 nm. The lower dielectric layer may comprise one or more of growth promotion layers, stabilisation layers, separation layers and/or barrier layers as required for proper functioning of the coating.

It is within the scope of the invention to apply the inventive concept to prepare low-emissivity and/or solar control coatings comprising two or more silver-based functional layers. When providing more than one silver-based functional layer, all of the silver-based functional layers are preferably spaced apart by intervening dielectric layers, referred to herein collectively as "central anti-reflection layers", to form a Fabry-Perot interference filter, whereby the optical properties of the low emissivity and/or solar control coating may be further optimized for the respective application.

Preferably, each silver-based functional layer is spaced apart from an adjacent silver-based functional layer by an intervening central dielectric layer. The intervening central dielectric layer(s) may comprise a combination of one or more of the following layers: a layer based on an (oxi)nitride of silicon and/or an (oxi)nitride of aluminium; a layer based on an oxide of zinc and tin or an oxide of tin and a layer based on a metal oxide such as an oxide of zinc.

In some embodiments, the coating further comprises a second silver-based functional layer between the silver-based functional layer and the upper dielectric layer. Preferably, the coating further comprises a central dielectric layer between the silver-based functional layer and the second silver-based functional layer and/or a second barrier layer between the second silver-based functional layer and the upper dielectric layer.

In some embodiments, the coating further comprises a third silver-based functional layer between the second silver-based functional layer and the upper dielectric layer. Preferably, the coating further comprises a second central dielectric layer between the second silver-based functional layer and the third silver-based functional layer and/or a third barrier layer between the third silver-based functional layer and the upper dielectric layer.

In some embodiments, the coating further comprises a fourth silver-based functional layer between the third silver-based functional layer and the upper dielectric layer. Preferably, the coating further comprises a third central dielectric layer between the third silver-based functional layer and the fourth silver-based functional layer and/or a fourth barrier layer between the fourth silver-based functional layer and the upper dielectric layer.

In some cases, central dielectric layers may comprise a layer comprising an oxide of zirconium and titanium $Zr_x$-

$Ti_yO_z$. In some embodiments, the layer comprising an oxide of zirconium and titanium $Zr_xTi_yO_z$ of a central dielectric layer may comprise an atomic proportion of Zr based on Zr and Ti, calculated as $x/(x+y)$, from 0.40 to 0.95.

In some preferred embodiments each silver-based functional layer is spaced apart from another silver-based functional layer by an intervening central dielectric layer, wherein each central dielectric layer comprises at least, in sequence from the silver-based functional layer that is located nearest to the glass substrate, a layer based on an (oxi)nitride of silicon and/or an (oxi)nitride of aluminium; a layer based on an oxide of zinc and tin or an oxide of tin; and a layer based on a metal oxide such as an oxide of zinc.

Therefore, for coated glass panes comprising two or more silver based functional layers it is preferred if each silver-based functional layer is spaced apart from an adjacent silver-based functional layer by an intervening central dielectric layer, wherein each central dielectric layer comprises at least, in sequence from the silver-based functional layer that is located nearest to the glass substrate:

a layer based on a mixed metal oxide comprising nickel and chromium;

a layer based on a mixed metal oxide based on zinc and aluminium, a layer based on an (oxi)nitride of silicon and/or an (oxi)nitride of aluminium;

a layer based on an oxide of tin preferably comprising zinc; and a layer based on a metal oxide such as an oxide of zinc.

Upper Dielectric Layer

Also in relation to the first aspect of the present invention, the coated glass comprises an upper dielectric layer. The upper dielectric layer may comprise, from the uppermost silver-based functional layer:

i) a layer based on an oxide of tin preferably comprising zinc, or a layer based on zinc preferably comprising aluminium, or a layer based on a nitride of tungsten; and/or ii) a layer based on an (oxi)nitride of silicon and/or an (oxi)nitride of aluminium, or a layer based on zinc preferably comprising aluminium.

Layers based on an oxide of tin preferably comprising zinc in the upper dielectric layer may preferably have a thickness of from 0.5 to 5 nm, more preferably from 1 to 4 nm, even more preferably from 1.5 to 3 nm. These preferred thicknesses enable further ease of deposition and improvement in optical characteristics such as haze whilst retaining mechanical durability.

Layers based on zinc preferably comprising aluminium in the upper dielectric layer may preferably have a thickness of from 0.5 to 5 nm, more preferably from 1 to 4 nm, even more preferably from 1.5 to 3 nm. These preferred thicknesses also enable further ease of deposition and improvement in optical characteristics such as haze whilst retaining mechanical durability.

Layers based on a nitride of tungsten in the upper dielectric layer may increase absorption while minimizing the influence of the layer based on a nitride of tungsten layer on the glass side reflection colour perceived by an observer, such that even if the light and/or energy transmission characteristics of a given coating stack are varied by modifying the thickness of the absorbing layer, the pane can exhibit almost the same appearance. The layer based on a nitride of tungsten preferably has a thickness of from 0.5 to 25 nm, more preferably from 1 to 15 nm, even more preferably from 2 to 8 nm, yet more preferably from 3 to 5 nm.

Layers in the upper anti-reflection layer based on an (oxi)nitride of aluminium or an (oxi) nitride of silicon may preferably comprise a thickness of at least 5 nm; preferably from 5 to 50 nm; more preferably from 10 to 40 nm; even more preferably from 10 to 30 nm; most preferably from 15 to 30 nm. Such thicknesses provide further improvement in terms of mechanical robustness of the coated pane. Said layer based on an (oxi)nitride of aluminium, an (oxi)nitride of silicon, may preferably be in direct contact with a layer comprising on an oxide of zinc (Zn) in the upper dielectric layer.

Layers based on an (oxi)nitride of aluminium, and/or an (oxi)nitride of silicon, may comprise a major part of the upper anti-reflection layer and provide stability (better protection during heat treatments) and diffusion barrier properties. Said layer is preferably deposited as an Al nitride and/or Si nitride layer by reactive sputtering of a Si, Al or mixed SiAl target, for example, of a $Si_{90}Al_{10}$ target in a $N_2$ containing atmosphere. The composition of the layer based on an (oxi)nitride of aluminium and/or an (oxi)nitride of silicon may be essentially stoichiometric $Si_{90}Al_{10}N_x$. Preferably the layers in the upper dielectric layer are based on essentially stoichiometric metal oxides. The use of layers based on essentially stoichiometric metal oxides rather than metallic or less than 95% stoichiometric barrier layers leads to an extremely high optical stability of the coating during a heat treatment and effectively assists in keeping optical modifications during heat treatment small. Additionally, the use of layers based on essentially stoichiometric metal oxides provides benefits in terms of mechanical robustness.

To further optimize the optical properties of the coated pane the upper dielectric layer and/or central dielectric layer(s) may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al or combinations thereof. When adding such further partial layers it should however be verified that the heat treatability aimed at herein is not impaired thereby.

In some cases, the upper dielectric layer may comprise a layer comprising an oxide of zirconium and titanium $Zr_xTi_yO_z$. In some embodiments, the layer comprising an oxide of zirconium and titanium $Zr_xTi_yO_z$ of the upper dielectric may comprise an atomic proportion of Zr based on Zr and Ti, calculated as $x/(x+y)$, from 0.40 to 0.95.

Growth Promotion Layer

Preferably, the coating further comprises a growth promotion layer between the base layer and the silver-based functional layer. The growth promotion layer functions as a growth promoting layer for a subsequently deposited silver-based functional layer. Preferably, the silver-based functional layer is in direct contact with the growth promotion layer.

In some embodiments, the growth promotion layer may be in direct contact with the base layer and the silver layer, such that no stabilisation layer is present between them. Preferably, where the growth promotion layer is in direct contact with the base layer the base layer has a thickness in nm of from 10 to 60.

Preferably, the growth promotion layer is based on an oxide of zinc. Zinc oxide and mixed zinc oxides are effective growth promoting layers and thereby assist in achieving a low sheet resistance at a given thickness of the subsequently deposited silver-based functional layer. The growth promotion layer based on an oxide of zinc is optionally mixed with metals such as aluminium or tin in an amount of up to about 10 weight % (weight % referring to the target metal content). A typical content of said metals such as aluminium or tin is about 2 weight %, aluminium being actually preferred.

It is preferred that the growth promotion layer based on an oxide of zinc of the lower dielectric layer is reactively sputtered from a zinc target in an atmosphere comprising oxygen ($O_2$), or deposited by sputtering from a ceramic target, for example based on zinc oxide and optionally doped with aluminium, in an atmosphere containing zero or only a small amount, that is, generally no more than about 5 volume %, of oxygen.

The growth promotion layer may preferably have a thickness of at least 2 nm. More preferably, the growth promotion layer may preferably have a thickness of from 2 to 15 nm; or from 3 to 12 nm. Even more preferably the growth promotion layer may preferably have a thickness of from 4 to 10 nm. Most preferably the growth layer has a thickness of from 5 to 8 nm.

Stabilisation Layer

Preferably, the coating further comprises a stabilisation layer between the base layer and the growth promotion layer. Preferably the stabilisation layer is in direct contact with the base layer and/or comprises (Zn) $SnO_x$.

The stabilisation layer is thought to improve stability during a heat treatment by providing a dense and thermally stable layer, and contributing to reduce the haze after a heat treatment.

Preferably the stabilisation layer comprises tin oxide, preferably comprising zinc, (Zn) $SnO_x$. As used herein, a layer comprising (Zn)$SnO_x$ may comprise either tin oxide, $SnO_x$, or zinc tin oxide, ZnSnOx.

When the stabilisation layer comprises zinc tin oxide, the stabilisation layer preferably comprises, in weight % of the total metal content of the layer: from 10 to 90 weight % zinc and from 90 to 10 weight % tin; more preferably from 40 to 60 weight % zinc and from 40 to 60 weight % tin; even more preferably around 50 weight % each of zinc and tin. In some preferred embodiments the stabilisation layer comprising zinc tin oxide comprises at most 18 weight % tin, more preferably at most 15 weight % tin, even more preferably at most 10 weight % tin. The stabilisation layer comprising zinc tin oxide is preferably deposited by reactive sputtering of a mixed ZnSn target in the presence of $O_2$.

The stabilisation layer preferably has a thickness of at least 0.5 nm. Preferably the stabilisation layer has a thickness of from: 0.5 to 15 nm; or 0.5 to 13 nm; or 1 to 12 nm. In addition, the stabilisation layer may have a thickness of from: 1 to 7 nm; or 2 to 6 nm; or 3 to 6 nm. Most preferably the stabilisation layer comprises zinc tin oxide and has a thickness of from 3 to 5 nm for a coated glass pane with layer sequence comprising a single silver-based functional layer. An upper thickness limit in the region of 8 nm is preferred due to optical interference conditions and by a reduction of heat treatability due to the resulting reduction in the thickness of the base layer that would be needed to maintain the optical interference boundary conditions for anti-reflecting the functional layer.

In an alternative embodiment in relation to the first aspect of the present invention, when the coated glass pane comprises more than one silver-based functional layer, the stabilisation layer preferably has a thickness of at least 10 nm. More preferably, the stabilisation layer has a thickness of from 10 nm to 20 nm. Even more preferably, the stabilisation layer has a thickness of from 12 nm to 16 nm. Most preferably, the stabilisation layer comprises zinc tin oxide and has a thickness of from 12 nm to 14 nm.

Separation Layer

In some embodiments, the coating further comprises a separation layer between the stabilisation layer and the growth promotion layer. Preferably, the separation layer is in direct contact with the stabilisation layer and/or comprises a metal oxide and/or an (oxi)nitride of silicon and/or an (oxi)nitride of aluminium and/or alloys thereof.

When the coating sequence comprises more than one silver-based coating layer, the lower dielectric layer preferably consists of, in sequence from the glass substrate: a stabilisation layer; and a growth promotion layer. However, when the coating sequence comprises only a single silver-based coating layer the lower dielectric layer may additionally comprise a separation layer between the stabilisation layer and the growth promotion layer.

The separation layer may preferably be based on a metal oxide and/or an (oxi)nitride of silicon and/or an (oxi)nitride of aluminium and/or alloys thereof.

The term "(oxi)nitride of silicon" encompasses both silicon (Si) nitride ($SiN_x$) and silicon (Si) oxinitride ($SiO_xN_y$), whilst the term "(oxi)nitride of aluminium" encompasses both aluminium (Al) nitride ($AlN_x$) and aluminium (Al) oxinitride ($AlO_xN_y$). Silicon (Si) nitride, silicon (Si) oxinitride, aluminium (Al) nitride and aluminium (Al) oxinitride layers are preferably essentially stoichiometric (for example, in silicon nitride=$Si_3N_4$, the value of x in $SiN_x$=1.33) but may also be substoichiometric or even super-stoichiometric, as long as the heat treatability of the coating is not negatively affected thereby. One preferred composition of the base layer based on an (oxi)nitride of silicon and/or an (oxi)nitride of aluminium of the lower dielectric layer is an essentially stoichiometric mixed nitride $Si_{90}Al_{10}N_x$.

Layers of an (oxi)nitride of silicon and/or an (oxi)nitride of aluminium may be reactively sputtered from silicon (Si—) and/or aluminium (Al)-based targets respectively in a sputtering atmosphere containing nitrogen and argon. An oxygen content of the layer based on an (oxi)nitride of silicon and/or an (oxi)nitride of aluminium may result from residual oxygen in the sputtering atmosphere or from a controlled content of added oxygen in said atmosphere. It is generally preferred if the oxygen content of the silicon (oxi)nitride and/or aluminium (oxi)nitride is significantly lower than its nitrogen content, that is, if the atomic ratio O/N in the layer is kept significantly below 1. It is most preferred to use silicon nitride and/or aluminium nitride with negligible oxygen content. This feature may be controlled by making sure that the refractive index of the layer does not differ significantly from the refractive index of an oxygen-free Si nitride and/or aluminium nitride layer.

It is within the scope of the invention to use mixed silicon (Si) and/or aluminium (Al) targets or to otherwise add metals or semiconductors to the silicon (Si) and/or aluminium (Al) component of this layer as long as the essential barrier and protection property of the layer is not lost. For example, the aluminium (Al) with silicon (Si) targets may be mixed, other mixed targets not being excluded. Additional components may be typically present in amounts of from 10 to 15 weight %. Aluminium is usually present in mixed silicon targets in an amount of 10 weight %.

In addition, the separation layer may preferably have a thickness of at least 0.5 nm; or preferably from 0.5 to 6 nm; more preferably from 0.5 to 5 nm; even more preferably from 0.5 to 4 nm; most preferably from 0.5 to 3 nm. These preferred thicknesses enable further improvement in haze upon heat treatment. The separation layer preferably provides protection during the deposition process and during a subsequent heat treatment. The separation layer is preferably either essentially fully oxidised immediately after deposition, or it oxidizes to an essentially fully oxidized layer during deposition of a subsequent oxide layer.

When the separation layer is based on a metal oxide said separation layer may preferably comprise a layer based on an oxide of: Ti, Zn, NiCr, InSn, Zr, Al and/or Si.

When the separation layer is preferably based on a metal oxide, it may be deposited using non-reactive sputtering from a ceramic target based on for example a slightly substoichiometric titanium oxide, for example a $TiO_{1.98}$ target, as an essentially stoichiometric or as a slightly substoichiometric oxide, by reactive sputtering of a target based on Ti in the presence of $O_2$, or by depositing a thin layer based on Ti which is then oxidised. In the context of the present invention, an "essentially stoichiometric oxide" means an oxide that is at least 95% but at most 100% stoichiometric, whilst a "slightly substoichiometric oxide" means an oxide that is at least 95% but less than 100% stoichiometric.

In addition to the metal oxide and/or (oxi)nitride of silicon and/or (oxi)nitride of aluminium and/or alloys thereof upon which it is based, the separation layer may further include one or more other chemical elements chosen from at least one of the following elements: Ti, V, Mn, Co, Cu, Zn, Zr, Hf, Al, Nb, Ni, Cr, Mo, Ta, Si, or from an alloy based on at least one of these materials, used for instance as dopants or alloyants.

Preferably however, the separation layer based on a metal oxide and/or (oxi)nitride of silicon and/or (oxi)nitride of aluminium does not include one or more other chemical elements.

In one preferred embodiment of the present invention, the separation layer is based on a metal oxide, which comprises an oxide of zinc (Zn) and/or an oxide of titanium.

In another preferred embodiment of the present invention, the separation layer is based on a metal oxide, which comprises an oxide of titanium.

It is especially preferred that the separation layer is based on an oxide of titanium when the layer sequence of the coated glass comprises one silver-based functional layer.

Whilst the separation layer may also be based on an oxide of titanium when the layer sequence comprises more than one silver-based functional layer, it may also be preferred that when the layer sequence or stack comprises more than one silver-based functional layer that the layer sequence does not comprise a separation layer in the lower dielectric layer.

In addition, it is preferred that when the separation layer is based on a metal oxide and that the metal oxide is based on titanium oxide, that the titanium oxide has a preferred thickness of from 0.5 to 3 nm.

Therefore, when the coating sequence comprises only a single silver-based coating layer the lower dielectric layer may consist of, in sequence from the glass substrate: a zinc tin oxide layer in direct contact with the base layer; a separation layer in direct contact with the zinc tin oxide layer; and a zinc oxide layer in direct contact with the separation layer.

Alternatively, when the coating sequence comprises more than one silver-based layer, the lower dielectric layer may consist of, in sequence from the glass substrate: a zinc tin oxide layer in direct contact with the base layer; and a zinc oxide layer in direct contact with the zinc tin oxide layer.

In a further embodiment, when the coating sequence comprises more than one silver-based layer, the growth promotion layer of preferably an oxide zinc may be in contact with the base layer and the silver-based layer. In this case, the zirconium titanium oxide base layer may be of increased thickness. Alternatively, when the coating sequence comprises more than one silver-based layer coating the coating sequence may comprise a zirconium titanium oxide base layer and a further zirconium titanium oxide stabilisation layer in contact with the base layer, and a zinc oxide layer in contact with the stabilisation layer. In this embodiment, the zinc tin oxide layer is not required in the lower dielectric layer, leading to a simpler coating structure.

Barrier Layer

Preferably, the coating further comprises a barrier layer between the silver-based functional layer and the upper dielectric layer. Preferably, the barrier layer is in direct contact with the silver-based functional layer.

Preferably, where the coating comprises multiple silver-based functional layers, each silver-based functional layer is in direct contact with an overlying barrier layer. At least a portion of the barrier layer that is in direct contact with the silver-based functional layer is preferably deposited using non-reactive sputtering to avoid silver damage. It has been found that a superior protection of the silver-based functional layer during the deposition process and a high optical stability during a heat treatment may be achieved if the barrier layer comprises a layer of a mixed metal oxide sputtered from a mixed metal oxide target.

In some embodiments, the barrier layer comprises a layer based on an oxide of zinc. When the barrier layer comprises a layer based on an oxide of zinc, said oxide may be a mixed metal oxide such as ZnO:Al. Good results are particularly achieved if a layer based on ZnO:Al is sputtered from a conductive ZnO:Al target. ZnO:Al may be deposited fully oxidized or such that it is slightly suboxidic.

The barrier layer may preferably comprise a layer based on an oxide of zinc with a thickness of: at least 0.5 nm, more preferably, the barrier layer comprises a layer based on an oxide of zinc with a thickness of from 0.5 to 10 nm. Most preferably the barrier layer comprises a layer based on an oxide of zinc with a thickness of from 1 to 10 nm. In addition, it is possible when the barrier layer comprises a layer based on an oxide of zinc for the barrier to actually comprise a number of zinc oxide layers such as layers based not only on a mixed metal oxide such as ZnO:Al, but also on an oxide of zinc and tin. Suitable barrier layers may therefore be in the form of three layers, in sequence from the glass substrate: ZnO:Al, $ZnSnO_x$, ZnO:Al. Such triple barrier arrangements may have a combined thickness of between 3 and 12 nm.

Further triple barrier arrangements may preferably be selected from the group consisting of the following combinations of layers in sequence from the silver-based functional layer: $ZnO:Al/TiO_x/ZnO:Al$, $ZnO:Al/ZnSnO_x/ZnO:Al$, $TiO_x/ZnSnO_x/ZnO:Al$, $TiO_x/ZnO:Al/TiO_x$, $TiO_x/ZnSnO_x/TiO_x$, and $ZnO:Al/ZnSnO_x/TiO_x$.

Alternatively, the barrier layer may comprise a layer based on a mixed metal oxide based on nickel and chromium, such as a layer of $NiCrO_x$. It has further been found that suitable protection of the silver-based functional layer during the deposition process and a high optical stability during heat treatment may be achieved if the barrier layer comprises a mixed metal oxide based on nickel and chromium, such as a layer of $NiCrO_x$. This is especially the case when the coated glass pane comprises two or more silver-based functional layers. However, the layer of $NiCrO_x$ may also be used when the coated glass pane comprises a single silver-based functional layer. Preferably, the layer of $NiCrO_x$ is deposited as substoichiometric $NiCrO_x$.

As such, in some embodiments, the barrier layer may preferably comprise a layer based on a mixed metal oxide based on nickel and chromium with a thickness of at least 0.5 nm, more preferably, the barrier layer comprises a layer based on a mixed metal oxide based on nickel and chromium with a thickness of from 0.5 to 10 nm. Most preferably the barrier layer comprises a layer based on a mixed metal oxide based on nickel and chromium with a thickness of from 1 to 10 nm.

Protective Layer

Preferably, the coated glass pane further comprises a protective layer that is the outermost layer of the coating, for increased mechanical and/or chemical robustness, for example scratch resistance. Preferably, the protection layer comprises a layer based on an oxide of zinc and tin. In addition to zinc and tin, the protection layer may contain zirconium. Preferably, a layer based on an oxide of zinc, tin and zirconium comprises from 12 to 35 atomic % zirconium. More preferably, the layer based on an oxide of zinc, tin and zirconium comprises from 15 to 33 atomic % zirconium. Most preferably, the layer based on an oxide of zinc, tin and zirconium comprises from 18 to 33 atomic % zirconium.

The inventors have discovered that coated glass panes according to the present invention may have excellent and controllable colour properties. As such, the provision of coated glass panes with attractive colours is possible.

In particular, highly colour neutral coated glass panes are achievable. Alternatively, where desired, slightly or even strongly coloured coated glass panes may be provided.

In a particular embodiment, it is desirable to provide a coated glass pane, wherein the coated glass pane has a Rg a* of from −6 to +6.5 and Rg b* of from −14 to −2.5.

Preferably, where the coated glass pane comprises a coating comprising only one silver-based functional layer, the coated glass pane has a Rg a* of from −3 to +6.5 and Rg b* of from −14 to −4.

Where the coated glass pane comprises a coating comprising two or more silver-based functional layers, it is preferable that the coated glass pane has a Rg a* of −6 to +4.8 and Rg b* of −18.5 to −2.3.

Such coated glazings are particularly suited to architectural glazings.

The sheet resistance (Rs) is dependent upon the number and thickness of silver layers in the coating, a higher number of silver layers, or a greater thickness, will contribute to lower sheet resistance measurements. Preferably, the sheet resistance RS is less than 8 Ω/□.

Where the coated glass pane comprises only one silver layer the sheet resistance after deposition may be less than 8Ω/□, preferably less than 7Ω/□, even more preferably less than 6Ω/□. Where the coated glass pane comprises only one silver layer, preferably the sheet resistance after heat treatment is less than 7Ω/□, preferably less than 6Ω/□, even more preferably less than 5 Ω/□.

Where the coated glass pane comprises two or more silver layers the sheet resistance after deposition may be less than 5Ω/□, preferably less than 4Ω/□, even more preferably less than 3 Ω/□. Where the coated glass pane comprises only two silver layers, the sheet resistance after heat treatment may be less than 4Ω/□, preferably less than 3Ω/□, even more preferably less than 2 Ω/□.

It is desirable that the change in sheet resistance caused by heat treatment is negative, indicating that the silver functional layer has not been damaged by heat treatment. Therefore, preferably ΔRs is negative.

The inventors have discovered that coated glass panes according to the present invention may have excellent properties such that they are suitable for submission to heat treatment processes.

In some embodiments, the coated glass pane is a heat treatable coated glass pane. As defined herein, a coated glass pane is deemed to be "heat treatable" if it survives a heat treatment without significant damage.

Preferably, the heat treatable coated glass pane, upon heat treatment, undergoes a change in sheet resistance, ΔRs, that is negative.

Preferably, the heat treatable coated glass pane, upon heat treatment, undergoes a change in light transmission TL that is positive. However, a large increase in light transmission may be undesirable, as this may increase glare. Therefore, preferably the % TL increases by no more than 10%, more preferably by no more than 5%.

Preferably, the heat treatable coated glass pane, upon heat treatment, provides a heat-treated coated glass pane with a hazescan value of less than 90, more preferably less than 60, yet more preferably less than 50.

In some embodiments, the coated glass pane is a heat treated coated glass pane. Preferably, the heat treated coated glass pane is a thermally bent coated glass pane or a thermally strengthened coated glass pane.

Coated glass panes that have undergone thermal bending preferably comprise a curve of radius at least 2°.

Coated glass panes that have undergone thermal toughening are preferably at least twice as strong as annealed glass of a similar thickness. Coated glass panes that have undergone thermal toughening are preferably at least four times as strong as annealed glass of a similar thickness.

Preferably, the thermally strengthened heat treated coated glass pane comprises a compressive stress on the surface of from 400 to 1500 kg/m². Where the thermally strengthened heat treated coated glass pane comprises a toughened glass pane, preferably the coated glass pane comprises a compressive stress on the surface of from 750 to 1500 kg/m². Alternatively, the thermally strengthened heat treated coated glass pane may comprise a compressive stress on the surface of from 400 to 700 kg/m²-such panes are known in the art as "heat strengthened" rather than "toughened".

Glass panes that have undergone thermal strengthening are regulated by standards such as EN12600, BS 6206:1981 and others.

Preferably, the thermally strengthened coated glass pane achieves Class 1 to EN 12600.

Preferably, the thermally toughened coated glass pane achieves class 1 to EN 12600 with a mode of breakage type C. More preferably, the thermally toughened coated glass pane achieves class 1 (C)1 to EN 12600. Preferably, the thermally toughened coated glass pane conforms to BS 6206:1981 Class C, more preferably Class B, yet more preferably Class A.

Glazings may be categorised according to their resistance against manual attack according to EN356. Preferably, the thermally toughened coated glass pane conforms to at least P1A and/or P6B according to EN356.

Preferably, glass panes that have undergone thermal toughening have been submitted to a heat soaking process.

In some embodiments, the heat treated coated glass pane has a ΔE* compared to a comparable annealed coated glass pane of less than or equal to 3. Preferably the heat treated coated glass pane has a ΔE* compared to a comparable annealed coated glass pane of less than or equal to 2. More preferably the heat treated coated glass pane has a $\Delta E^*$ compared to a comparable annealed coated glass pane of less than or equal to 1.

In some embodiments the heat treated coated glass pane exhibits a hazescan value of less than 90. Preferably the hazescan value is less than 80 and even more preferably less than 70 is desirable. In some specialist applications, where clarity is prioritised, a hazescan value of less than 60 is desired, and preferably less than 50.

It will be appreciated that coatings according to the present invention may include further coating layers, and that any further layer may contain additives that modify its properties and/or facilitate its manufacture, for example, doping agents or reaction products of reactive sputtering gases. In the case of oxide based layers, nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

Care must be taken by performing a proper material, structure and thickness selection when adding any such further partial layer to the basic layer sequence of the inventive pane that the properties primarily aimed at, for example, a high thermal stability, are not significantly impaired thereby.

Also, in the context of the present invention, where a layer is said to be "based on" a particular material or materials this means, unless stated otherwise, that the layer predominantly comprises said material or materials in an amount of at least 50 atomic %.

Where a layer is based on $ZnSnO_x$, "$ZnSnO_x$" means a mixed oxide of Zn and Sn as described and defined elsewhere in the description.

Herein embodiments according to the present invention are disclosed which may provide particularly beneficial properties. The following non-limiting example layer sequences are provided in order from the glass substrate, and in the following layer sequences, a "/" indicates a boundary between layers which are adjacent to, and in contact with, one another at the boundary. For example, embodiments of the invention may comprise coated glass panes wherein the coating comprises, preferably consists of:

i)  $Zr_xTi_yO_z$/$ZnSnO_x$/$TiO_x$/$AlZnO_x$/Ag/$NiCrO_x$/$AlZnO_x$/$AlN_x$/$ZnSnO_x$; or ii) $Zr_xTi_yO_z$/$AlZnO_x$/Ag/$AlZnO_x$/$ZnSnO_x$/$ZrO_x$; or iii) $Zr_xTi_yO_z$/$AlZnO_x$/Ag/NiCr/$AlZnO_x$/$ZnSnO_x$/$ZrO_x$; or iv) $Zr_xTi_yO_z$/$AlZnO_x$/Ag/$AlZnO_x$/$ZnSnO_x$/Ag/$AlZnO_x$/$ZnSnO_x$/$ZrO_x$.

According to a second aspect of the present invention there is provided a method of manufacturing a coated glass pane according to a first aspect of the present invention comprising the steps of:

i) providing a glass substrate;

ii) providing a base layer;

iii) providing a silver-based functional layer; and iv) providing an upper dielectric layer.

In relation to the second aspect of the present invention it will be appreciated that all features of the first aspect of the present invention, such as the glass substrate, the base layer, the upper dielectric layer, and the silver-based functional layer, may also be applied to the second aspect of the present invention in any combination.

The invention is not limited to a specific production process for the coating. However, it is particularly preferred if at least one of the layers and most preferably all layers are applied by magnetron cathode sputtering, either in the DC mode, in the pulsed mode, in the medium frequency mode or in any other suitable mode, whereby metallic or semiconducting targets are sputtered reactively or non-reactively in a suitable sputtering atmosphere. Depending on the materials to be sputtered, planar or rotating tubular targets may be used.

Preferably, the base layer, and/or the silver-based functional layer, and/or the upper dielectric layer are provided by physical vapour deposition.

Preferably, the base layer is provided by physical vapour deposition in a substantially inert atmosphere from a ceramic target, or provided by physical vapour deposition in a substantially oxidising atmosphere from one or more metallic targets.

A substantially inert atmosphere is defined herein as an atmosphere with less than or equal to 10% oxygen. A substantially oxidising atmosphere is defined herein as an atmosphere with greater than 10% oxygen.

In the context of the present invention the term "non-reactive sputtering" includes sputtering an oxidic target in a low oxygen atmosphere (that is with zero, or up to 10% volume oxygen) to provide an essentially stoichiometric oxide.

In some embodiments, the base layer is produced using reactive sputtering from a TiZr metallic target in $Ar/O_2$ atmosphere. Alternatively, the base layer is produced by co-sputtering a titanium metallic target and a zirconium metallic target in $Ar/O_2$ atmosphere. Alternatively, the base layer is produced by sputtering from a $Ti_xZr_yO_x$ ceramic target in an atmosphere with less than 10% oxygen.

The layers based on an oxide of Zn, Ti, ZnSn, InSn, Zr, Al, Sn and/or Si, and/or an (oxi)nitride of Si and/or of Al, may be deposited by non-reactive sputtering. Said layers may be sputtered from ceramic targets.

The layers based on an oxide of Zn, Ti, ZnSn, InSn, Zr, Al, Sn and/or Si, and/or an (oxi)nitride of Si and/or of Al, may also be deposited by reactive sputtering. Said layers may be sputtered from one or more metal targets.

Layers may be provided to their total final thickness in a single coating pass. Alternatively, multiple coating passes using the same coating chemistry may be used to provide a single layer of final thickness. As used herein, sublayers of substantially the same composition provided by multiple passes are considered together as being a single layer with a thickness equal to the sum of the thicknesses of the sublayers.

To minimize any light absorption in the coating and to reduce the light transmittance increase during heat treatment where this is not desired, all individual layers of the upper and lower dielectric layers are preferably deposited with an essentially stoichiometric composition. In particular, the coating process is preferably carried out by setting up suitable coating conditions such that any oxygen (or nitrogen) deficit of any oxide (or nitride) layer of the anti-reflection layers of the coating is kept low, to achieve a high stability of the light transmittance and colour of the coated glass panes during heat treatment.

Light transmittance values referred to in the specification are generally specified with reference to a coated glass pane comprising a 4 mm thick standard float glass pane having a light transmittance TL in the region of 90% without a coating.

While a neutral reflection and transmission colour of the coated glass panes is usually aimed at, the colour of the coated glass panes according to the invention may be varied widely by adapting the thicknesses of the individual layers appropriately according to the intended visual appearance of the product.

The thermal stability of coated glass panes according to the invention is reflected by the fact that the heat treated coated glass panes do not exhibit unacceptable levels of haze. Large increases in the haze value (hazescan) if detected during a heat treatment would indicate that the coating is beginning to be damaged.

According to a third aspect of the present invention there is provided a multiple glazing unit incorporating a coated glass pane in accordance with the first and/or second aspects of the present invention. In addition, the multiple glazing unit according to the third aspect of the present invention may be a laminated glazing unit and/or an insulated glazing unit.

According to a fourth aspect of the present invention there is provided the use of a coated glass pane according to, or manufactured by, any previous embodiment, in a building or vehicle.

Features of the first and/or second aspects of the present invention may be applied to the third and fourth aspect in any combination.

BRIEF DESCRIPTION OF THE FIGURES

Embodiments of the present invention will now be described herein, by way of the non-limiting examples and with reference to FIGS. 1 to 7.

DETAILED DESCRIPTION OF THE INVENTION

Figure 7:
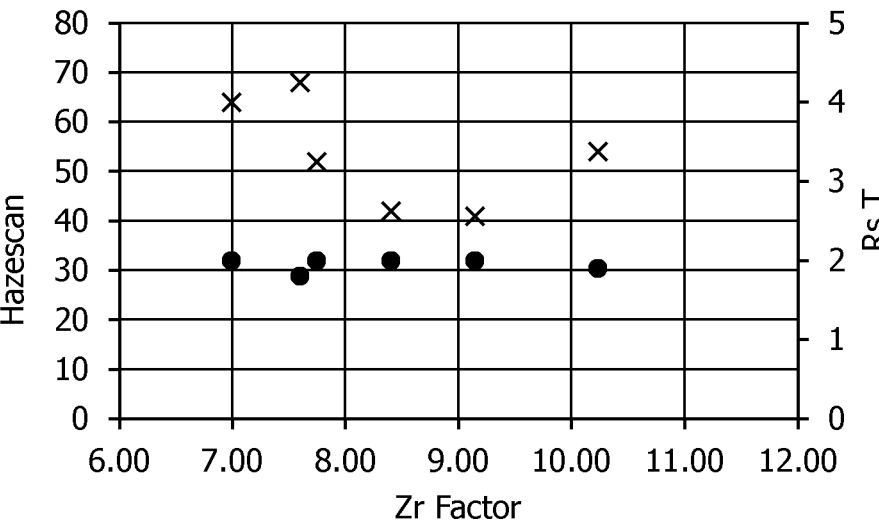

FIG. 7 illustrates a chart of Hazescan and sheet resistance after heat treatment, Rs T, against Zr factor for coated glass panes comprising coatings comprising two or more silver layers.

In the figures like features are represented with like numerals.

Figure 1:
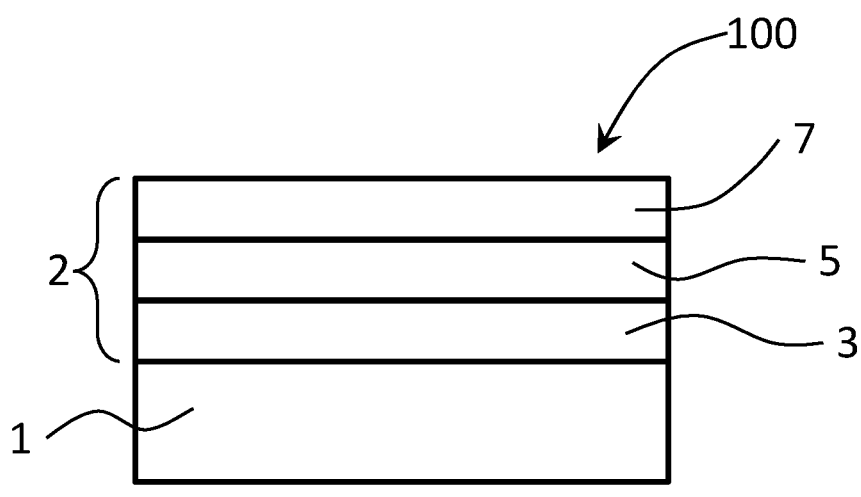
FIG. 1 illustrates a schematic cross-sectional view of a coated glass pane according to a first embodiment of the present invention.

FIG. 1 depicts a coated glass pane 100 according to a first embodiment of the present invention comprising a glass substrate 1 and a coating 2, wherein the coating 2 comprises, in sequence from the glass substrate 1: a base layer 3 adjacent to and in contact with the glass substrate 1; a silver-based functional layer 5; and an upper dielectric layer 7, wherein: the base layer 3 comprises an oxide of zirconium and titanium; and the atomic proportion of Zr based on Zr and Ti in the base layer is from 0.40 to 0.95.

Figure 2:
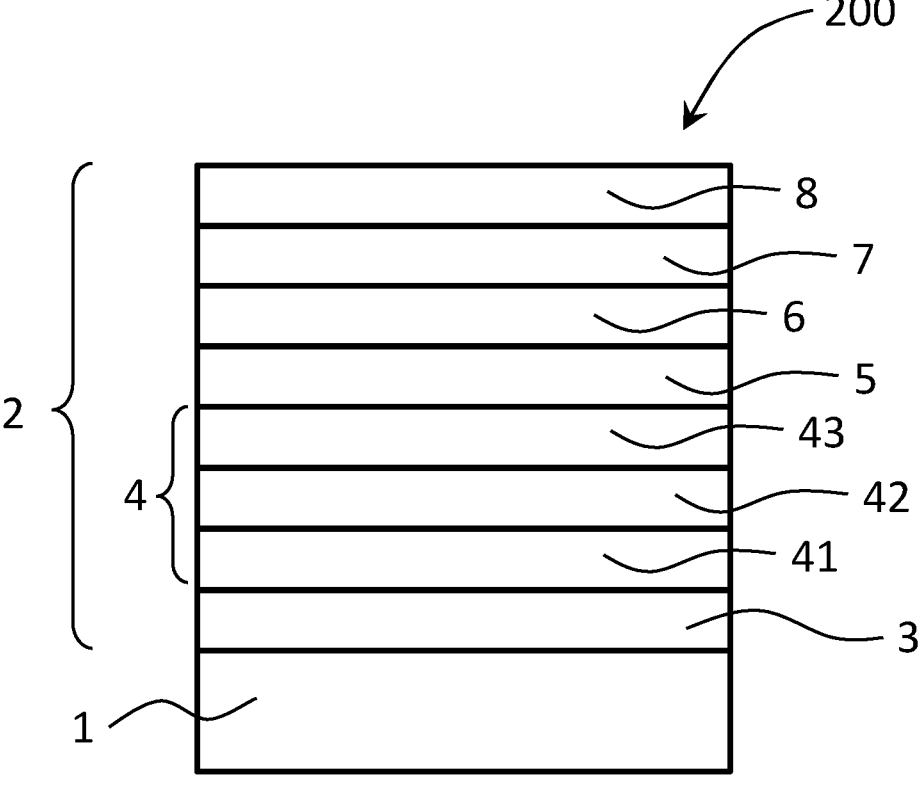
FIG. 2 illustrates a schematic cross-sectional view of a coated glass pane according to a second embodiment of the present invention.

FIG. 2 depicts a coated glass pane 200 according to a second embodiment of the present invention, comprising a glass substrate 1 and a coating 2, wherein the coating 2 comprises, in sequence from the glass substrate 1: a base layer 3 adjacent to and in contact with the glass substrate 1; a lower dielectric layer 4 comprising a stabilisation layer 41, a separation layer 42, and a growth layer 43; a silver-based functional layer 5; a barrier layer 6; an upper dielectric layer 7, and a protection layer 8, wherein: the base layer 3 comprises an oxide of zirconium and titanium; and the atomic proportion of Zr based on Zr and Ti in the base layer is from 0.40 to 0.95.

Figure 3:
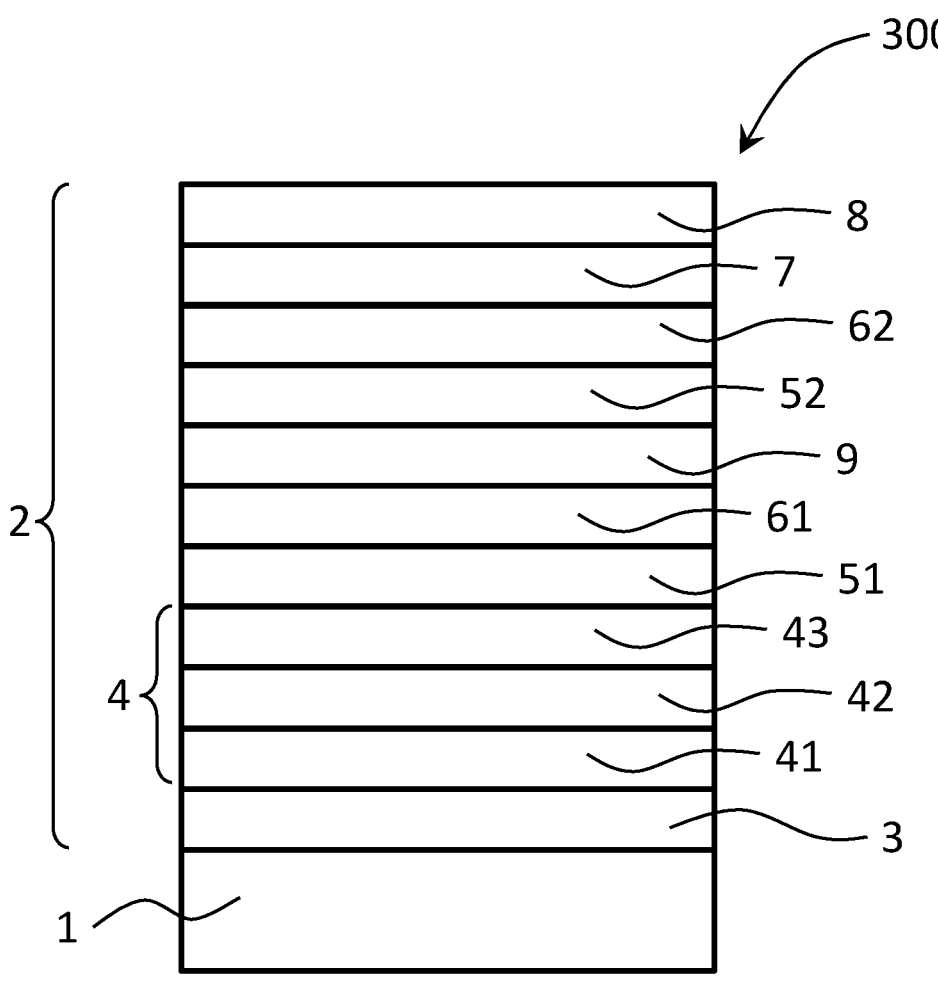
FIG. 3 illustrates a schematic cross-sectional view of a coated glass pane according to a third embodiment of the present invention.

FIG. 3 depicts a coated glass pane 300 according to a third embodiment of the present invention, comprising a glass substrate 1 and a coating 2, wherein the coating 2 comprises, in sequence from the glass substrate 1: a base layer 3 adjacent to and in contact with the glass substrate 1; a lower dielectric layer 4 comprising a stabilisation layer 41, a separation layer 42, and a growth layer 43; a first silver-based functional layer 51; a first barrier layer 61; a central dielectric layer 9; a second silver based functional layer 52; a second barrier layer 62; an upper dielectric layer 7, and a protection layer 8, wherein: the base layer 3 comprises an oxide of zirconium and titanium; and the atomic proportion of Zr based on Zr and Ti in the base layer is from 0.40 to 0.95.

Example embodiments of the present invention will now be described herein, by way of example only.

For all examples the coatings were deposited on 4 mm thick standard float glass panes with a light transmittance in the region of 90% using AC and/or DC magnetron (or pulsed DC) sputtering devices, medium-frequency sputtering being applied where appropriate.

Base layers comprising an oxide of zirconium and titanium were reactively co-sputtered from a first target of titanium metal and a second target of zirconium metal in an argon/oxygen (Ar/O$_2$) sputter atmosphere with approximately 12% oxygen. The proportions of Zr and Ti were varied by altering the sputtering power over the targets. The power of the Ti target was varied between 0.4 and 1.5 kW, and the power of the Zr target was varied between 0.15 and 1.5 kW.

Dielectric layers of an oxide of zinc and tin were reactively sputtered from zinc-tin targets (weight ratio Zn:Sn approximately 50:50) in an argon/oxygen (Ar/O$_2$) sputter atmosphere.

Dielectric layers of an oxide of zinc (Zn), tin (Sn) and zirconium (Zr) were co-sputtered using metallic ZnSn (weight ratio Zn:Sn approximately 50:50) and Zr targets in an Ar/O$_2$ or pure argon (Ar) atmosphere.

The titanium oxide (TiO$_x$) layers were deposited from metallic titanium (Ti) targets in an argon/oxygen (Ar/O$_2$) sputter atmosphere.

The ZnO:Al growth promoting top layers of the lower dielectric layers were sputtered from Al-doped Zn targets (aluminium (Al) content about 2 weight %) in an Ar/O$_2$ sputter atmosphere.

The functional layers that in all examples consisted of essentially pure silver (Ag) were sputtered from silver targets in an Ar sputter atmosphere without any added oxygen and at a partial pressure of residual oxygen below 10-5 mbar.

The barrier layers located above the silver-based functional layers of zinc aluminium oxide (also referred to as ZAO), were sputtered from conductive ZnO$_x$:Al targets comprising 2% $AlO_x$ by weight in a pure Argon (Ar) sputter atmosphere with less than 5% oxygen.

Table 1 provides details of a number of comparative coated glass panes and coated glass panes according to the present invention. Comparative example CE1 was prepared by sputtering a soda-lime silica glass sheet to provide a glass pane with a coating comprising, in order from the glass surface: $SiN_x$ (20 nm), $ZnSnO_x$ (4 nm), ZAO(8 nm), Ag (10 nm), $NiCrO_x$ (1 nm) ZAO(6 nm), $SiN_x$ (24 nm), $ZnSnO_x$ (9 nm). CE1 is a "baseline" coating with properties which are acceptable in many situations. However, as discussed above, it is desirable to provide alternative coatings that are more suitable for architectural and automotive applications.

Further comparative examples CE2 and CE3, and examples 1 to 20 were produced in a similar manner, but the $SiN_x$ base layer of CE1 was replaced by $Zr_xTi_yO_z$ layers to provide a coating comprising, in order from the glass surface: $Zr_xTi_yO_z$, $ZnSnO_x$ (4 nm), ZAO(8 nm), Ag (10 nm), $NiCrO_x$ (1 nm) ZAO(6 nm), $SiN_x$ (24 nm), $ZnSnO_x$ (9 nm). The $Zr_xTi_yO_z$ layers were of varying compositions and thicknesses, as disclosed in Table 1.

20 and before heat treatment, and Rf $\Delta E^*$—which is a measure of the change in film side reflectance upon heat treatment.

The methodology used to collect the data in Table 1 is set out below.

CE2 and CE3 have unacceptably high Hazescan values, which are apparently caused by the low atomic proportion of Zr, 0.6, and/or low Zr factor of 0.93.

Example 1 has a Hazescan value which is improved compared to CE2 and CE3, and may be acceptable in some situations, but is not superior to the baseline coating. However, the improvement in sheet resistance due to heat treatment is superior for example 1 when compared to CE1. As such, the increase in atomic proportion of Zr and/or Zr factor has improved the properties of the coating.

Example 2 exhibits a good Hazescan value of 70, lower than the comparative examples CE1 and CE2. However, the colour coordinates for the coating side reflection are in a desirable area, and example 1 exhibits a lower Rf $\Delta E^*$ value than other examples, indicating excellent colour consistency following heat treatment.

Example 12 exhibits a good Hazescan value of 63, excellent transmission before and after heat treatment and

TABLE 1

| Example | $Zr_xTi_yO_2$ Composition atomic % Zr | Ti | O | Atomic proportion of Zr | Base layer thickness nm | Zr Factor T | Hazescan T | TL % AD | Δ TL | Rs AD Ω/□ | Δ RS Ω/□ | Rs T Ω/□ | Rf a* AD | Rf b* AD | Rf Δ E* |
|---|---|---|---|---|---|---|---|---|---|---|---|---|---|---|---|
| CE1 | — | — | — | — | 20 | — | 58 | 82 | 5.2 | 6.3 | −1.7 | 4.6 | — | — | — |
| CE2 | 2.1 | 34.1 | 62.9 | 0.06 | 16 | 0.93 | 225 | 83 | 4.9 | 5.9 | −1.6 | 4.3 | −1.33 | −4.9 | 2 |
| CE3 | 2.1 | 34.1 | 62.9 | 0.06 | 16 | 0.93 | 214 | 82.9 | 5.4 | 5.7 | −1.5 | 4.2 | −1.44 | −4.65 | 2 |
| 1 | 17 | 18.4 | 64.6 | 0.48 | 16 | 7.68 | 97 | 82.5 | 5.5 | 6.1 | −2.1 | 4 | −0.25 | −5.86 | 1.9 |
| 2 | 19.7 | 15.6 | 64.7 | 0.56 | 16 | 8.93 | 70 | 82.8 | 5.6 | 5.5 | −1.7 | 3.8 | 0.25 | −6.12 | 1.4 |
| 3 | 20.4 | 14.6 | 65 | 0.58 | 16 | 9.33 | 93 | 81.9 | 5.8 | 6.3 | −2 | 4.3 | −0.8 | −9.1 | 2.5 |
| 4 | 20.4 | 14.6 | 65 | 0.58 | 16 | 9.33 | 95 | 81.3 | 6.2 | 6.4 | −1.9 | 4.5 | −1.6 | −10.5 | 3 |
| 5 | 20.7 | 14.7 | 64.6 | 0.58 | 11.4 | 6.67 | 116 | 83.5 | 3.8 | 6.2 | −2 | 4.2 | −0.49 | −11.16 | 2.6 |
| 6 | 20.7 | 14.7 | 64.6 | 0.58 | 14 | 8.19 | 73 | 82.3 | 5.4 | 5.8 | −1.8 | 4 | −0.38 | −10.4 | 2.6 |
| 7 | 20.7 | 14.7 | 64.6 | 0.58 | 14 | 8.19 | 69 | 82.5 | 5.6 | 5.7 | −1.9 | 3.8 | −0.33 | −8.09 | 1.8 |
| 8 | 20.7 | 14.7 | 64.6 | 0.58 | 16 | 9.36 | 80 | 82.5 | 5.9 | 6 | −2.2 | 3.8 | −0.35 | −7.09 | 2.4 |
| 9 | 20.7 | 14.7 | 64.6 | 0.58 | 16 | 9.36 | 80 | 81.7 | 5.6 | 5.9 | −2 | 3.9 | −3.75 | −10.5 | 3.7 |
| 10 | 20.7 | 14.7 | 64.6 | 0.58 | 18 | 10.53 | 84 | 82.6 | 5.6 | 6.2 | −1.4 | 4.8 | −2.36 | −8 | 3.5 |
| 11 | 20.7 | 14.7 | 64.6 | 0.58 | 18 | 10.53 | 86 | 82.7 | 5.6 | 5.9 | −1.5 | 4.4 | −2.36 | −7.27 | 2.9 |
| 12 | 20.7 | 14.7 | 64.6 | 0.58 | 20 | 11.69 | 63 | 83.5 | 5.4 | 5.8 | −1.9 | 3.9 | 0.28 | 1.16 | 0.6 |
| 13 | 20.7 | 14.7 | 64.6 | 0.58 | 20 | 11.69 | 64 | 83.3 | 5.8 | 5.6 | −2 | 3.6 | −0.39 | −0.81 | 1 |
| 14 | 21.9 | 13.6 | 64.5 | 0.62 | 16 | 9.87 | 58 | 81.9 | 5.6 | 6 | −2.1 | 3.9 | 0.33 | −9.49 | 2.6 |
| 15 | 22.9 | 12.3 | 64.8 | 0.65 | 16 | 10.41 | 45 | 82.1 | 5.5 | 6 | −2.1 | 3.9 | 0.47 | −8.19 | 2.5 |
| 16 | 22.9 | 12.3 | 64.8 | 0.65 | 16 | 10.41 | 65 | 81.9 | 5.5 | 5.8 | −2 | 3.8 | 0.44 | −5.8 | 2.2 |
| 17 | 25 | 10.7 | 64.6 | 0.70 | 16 | 11.20 | 56 | 81.5 | 6 | 6.6 | −2.3 | 4.3 | −1.65 | −9.6 | 3.3 |
| 18 | 26.3 | 8.2 | 65.5 | 0.76 | 16 | 12.20 | 47 | 81.3 | 5.2 | 6.6 | −2.2 | 4.4 | −1.8 | −10.5 | 2.8 |
| 19 | 32.2 | 3.4 | 64.4 | 0.90 | 16 | 14.47 | 81 | 81.7 | 4 | 6.4 | −2.1 | 4.3 | 1 | −9.91 | 1.8 |
| 20 | 32.2 | 3.4 | 64.4 | 0.90 | 16 | 14.47 | 135 | 81.6 | 2.7 | 6.5 | −1.6 | 4.9 | 1.37 | −10.47 | 2.8 |

Immediately after deposition of all of the coatings, the coated glass sheet parameters (such as sheet resistance (Rs), UV-vis optical performance) for the coated glass panes were measured. The samples were then heat treated in the region of 650° C. for 5 minutes. Thereafter, Hazescan, sheet resistance (Rs), UV-vis optical performance were measured and the change in light transmittance ($\Delta$TL), and the change in colour characteristics (described by changes in a*, b* and Y) upon heat treatment ($\Delta E^*$), calculated there from as discussed below. The measured and calculated results are provided in Table 1, as follows: haze, TL % AD—percentage (%) light transmittance value for the glass substrate before heat treatment, $\Delta$TL—the change in percentage (%) light transmittance upon heat treatment, Rs AD Ω/□—sheet resistance before heat treatment, $\Delta$ RS—change in sheet resistance upon heat treatment, Rs T—sheet resistance after heat treatment, Rf a* AD—film reflected a* colour component after deposition and before heat treatment, Rf b* AD—film reflected b* colour component after deposition Rs T of less than 4. The Rf a* and b* are slightly positive, which may be desirable in some situations, and are not significantly altered by heat treatment as indicated by the low Rf $\Delta E^*$ value.

Example 15 exhibits an exceptional Hazescan value of 45 and a good Rs AD of 6 which is enhanced by heat treatment to a large extent to provide a Rs T of less than 4.

Figure 4:
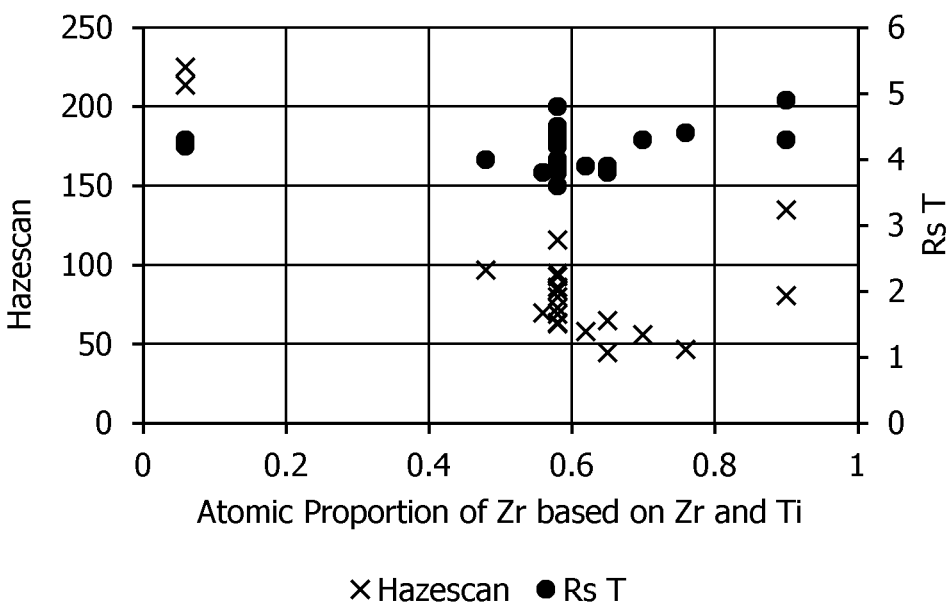
FIG. 4 illustrates a chart of Hazescan and sheet resistance after heat treatment, Rs T, against atomic proportion of Zr based on Zr and Ti for coated glass panes comprising coatings comprising only one silver layer.

FIG. 4 depicts the Hazescan of comparative examples CE2 and CE3 and examples 1 to 20 against atomic proportion of Zr. It can be seen that Hazescan improves with increasing atomic proportion of Zr, reaching a minimum of 45 for a Zr proportion of 0.65, but then increases with atomic proportion of Zr above this. Good Hazescan values of less than 70 are achievable by atomic proportions of Zr of 0.55 to 0.85, and excellent Hazescan values of less than 60 are achievable by atomic proportions of Zr of from 0.6 to 0.8.

FIG. 4 also depicts Rs T of comparative examples CE2 and CE3 and examples 1 to 20 against atomic proportion of Zr. It can be seen that, similarly to Hazescan, Rs T decreases with increasing atomic proportion of Zr to a minimum Rs T of 3.6 at a Zr proportion of 0.58, and then increases with atomic proportion of Zr above this. Good Rs T values of less than 4 are achievable with atomic proportions of Zr of 0.55 to 0.85.

Figure 5:
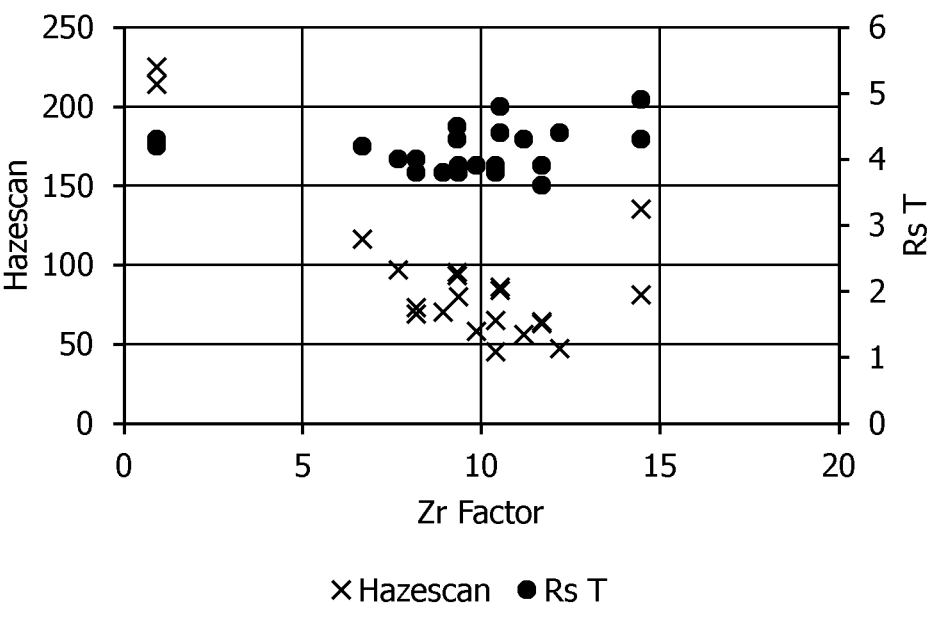
FIG. 5 illustrates a chart of Hazescan and sheet resistance after heat treatment, Rs T, against Zr factor for coated glass panes comprising coatings comprising only one silver layer.

FIG. 5 depicts the Hazescan of comparative examples CE2 and CE3 and examples 1 to 20 against Zr factor. It can be seen that Hazescan improves with increasing Zr factor, reaching a minimum of 45 for a Zr factor of 10.53, but then increases with Zr factor above this. Good Hazescan values of less than 70 are achievable by Zr factors of from 7 to 15, and excellent Hazescan values of less than 60 are achievable by Zr factors of from 9 to 12.

FIG. 5 also depicts Rs T of comparative examples CE2 and CE3 and examples 1 to 20 against Zr factor. It can be seen that, similarly to Hazescan, Rs T decreases with increasing Zr factor to a minimum Rs T of 3.6 at a Zr factor of 11.69, and then increases with Zr factor above this. Good Rs T values of less than 4 are achievable with Zr factors of from 7 to 15.

Coated glass panes with more than one silver layer were investigated. A comparative example CED was prepared by sputtering with the following layers from the glass surface: $SiN_x$ (18 nm); $ZnSnO_x$ (13 nm); ZAO(3 nm); Ag (9.5 nm); $NiCrO_x$ (1 nm); ZAO(7 nm); $SiN_x$ (40 nm); $ZnSnO_x$ (11 nm); ZAO(14 nm); Ag (12.8 nm); $NiCrO_x$ (1 nm); ZAO(5 nm); $SiN_x$ (21 nm); $ZnSnO_x$ (8 nm).

Examples D1 to D6 were prepared by sputtering, using the same methods.

In D1, and D3 to D6 the $SiN_x$ base layer of CED was replaced with a layer of $Zr_xTi_yO_z$, to provide a coating according to the present invention comprising: $Zr_xTi_yO_z$; $ZnSnO_x$ (13 nm); ZAO (3 nm); Ag (9.5 nm); $NiCrO_x$ (1 nm); ZAO (7 nm); $SiN_x$ (40 nm); $ZnSnO_x$ (11 nm); ZAO (14 nm); Ag (12.8 nm); $NiCrO_x$ (1 nm); ZAO (5 nm); $SiN_x$ (21 nm); $ZnSnO_x$ (8 nm).

In D2 both the $SiN_x$ base layer and the $ZnSnO_x$ layer immediately adjacent to the base layer of CED were replaced with a single layer of $Zr_xTi_yO_z$ of thickness 17.5 nm, to provide a coating according to the present invention comprising: $Zr_xTi_yO_z$ (17.5 nm); ZAO(3 nm); Ag (9.5 nm); $NiCrO_x$ (1 nm); ZAO (7 nm); $SiN_x$ (40 nm); $ZnSnO_x$ (11 nm); ZAO (14 nm); Ag (12.8 nm); $NiCrO_x$ (1 nm); ZAO (5 nm); $SiN_x$ (21 nm); $ZnSnO_x$ (8 nm).

TABLE 2

| | | CED | D1 | D2 | D3 | D4 | D5 | D6 |
|---|---|---|---|---|---|---|---|---|
| $Zr_xTi_yO_2$ | Zr | — | 20.7 | 20.7 | 20.4 | 22.8 | 25 | 26.3 |
| Composition | Ti | — | 14.7 | 14.7 | 14.6 | 12.5 | 10.7 | 8.2 |
| atomic % | O | — | 64.6 | 64.6 | 65 | 64.6 | 64.6 | 65.5 |
| Atomic proportion of Zr | | — | 0.58 | 0.58 | 0.58 | 0.65 | 0.70 | 0.76 |
| Base layer thickness nm | | 18 | 13 | 17.5 | 12 | 12 | 12 | 12 |
| Zr Factor | | — | 7.60 | 10.23 | 6.99 | 7.75 | 8.40 | 9.15 |
| Hazescan after toughening | | 39 | 68 | 54 | 64 | 52 | 42 | 41 |
| TL % AD | | 70 | 71.5 | 70.9 | 69.3 | 69.4 | 69 | 68.8 |
| Δ TL | | 10.6 | 10.7 | 9.8 | 11.6 | 11.2 | 11.9 | 11.7 |
| Rs AD Ω/□ | | 3 | 2.7 | 2.7 | 2.9 | 2.8 | 2.9 | 2.9 |
| Δ RS | | -0.4 | -0.9 | -0.8 | -0.9 | -0.8 | -0.9 | -0.9 |
| Rs T | | 2.6 | 1.8 | 1.9 | 2 | 2 | 2 | 2 |
| Rf a* AD | | -1.29 | -0.94 | -2.64 | -1.06 | -0.7 | -2.2 | -1.9 |
| Rf b* AD | | -0.1 | -0.68 | 3.34 | 1.34 | 1.3 | 1.9 | 1.5 |
| Rf Δ E* | | 2.9 | 6 | 6.7 | 5.6 | 5.8 | 5.9 | 6.1 |

Figure 6:
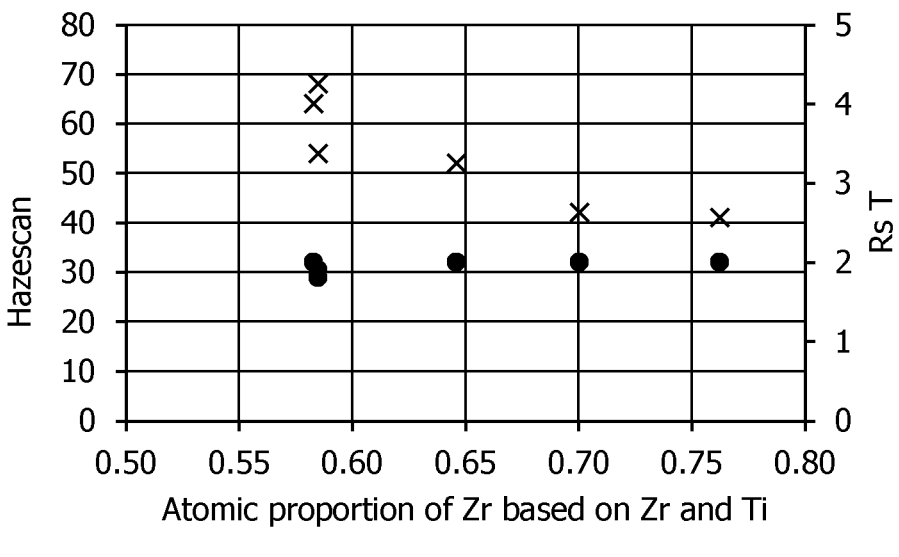
FIG. 6 illustrates a chart of Hazescan and sheet resistance after heat treatment, Rs T, against atomic proportion of Zr based on Zr and Ti for coated glass panes comprising coatings comprising two or more silver layers.

Examples D1 to D6 offer superior sheet resistance compared to CED, both before and after heat treatment. In addition, Examples D1 to D6 offer good, and in some cases excellent Hazescan results. As depicted in FIG. 6, for coatings including two or more silver layers an increase in atomic proportion of Zr based on Zr and Ti of the base layer is associated with a decrease in Hazescan value, and an atomic proportion of Zr based on Zr and Ti of from 0.6 to 0.8 is particularly beneficial.

As depicted in FIG. 7 Hazescan reaches a minimum value at a Zr factor of 9.15. For coatings including two or more silver layers a Zr factor of the base layer from 8 to 10 is particularly beneficial.

The methodologies used to collect the above disclosed data include:

Light Transmittance—The values stated for the change in percentage (%) light transmittance upon heat treatment (ΔTL) of the coated glass panes were derived from measurements using illuminant D65, for a 10 degree observer field of view across wavelengths ranging from 350-1050 nm.

Sheet Resistance/Change in sheet resistance for examples—Sheet resistance measurements were made using a NAGY SRM-12. This device utilises an inductor to generate eddy currents in a 100 mm×100 mm coated sample. This produces a measurable magnetic field, the magnitude of which is related to the resistivity of the sample. With this method the sheet resistance can be calculated. The instrument was used to measure the sheet resistance of samples before and after heat treatment at 650° C. for 5 minutes.

Colour characteristics—The colour characteristics for each of sample were measured and reported using the well-established CIE LAB L*, a*, b* coordinates (as described for example in paragraphs [0030] and [0013] of WO 2004/063111A1, incorporated herein by reference). In some situations, it is desirable for the coated pane to exhibit neutral colours in transmission (T), glass side reflection (Rg), and coating, i.e. film, side reflection (Rf), that is a* and b* values from −5 to +5, preferably from −2 to +2. However, in some applications and markets more blue colours are desirable, wherein a* and b* are both <0 and may even be <−5 for strongly blue colours. Alternatively, bronze colours are sometimes desirable, wherein a* and b* are both >0 and may even be >5.

The change in transmission colour upon heat treatment, $\Delta E^* = ((\Delta a^*)^2 + (\Delta b^*)^2 + (\Delta L^*)^2)^{1/2}$, wherein $\Delta L^*$, $\text{Aa}^*$ and $\text{Ab}^*$ are the differences of the colour values L*, a*, b* of the coated glass pane each before and after a heat treatment. $\Delta E^*$ values of less than 3 (for example 2 or 2.5) are preferred for layer sequences with one silver-based functional layer, representing a low and practically non-noticeable colour modification caused by the heat treatment. For layer sequences comprising two or more silver-based functional layer, lower T $\Delta E^*$ values provide an indication of the stability of the sequences; the lower the T $\Delta E^*$ values the more superior the results and appearance of the coated glass pane.

Hazescan—A haze scoring system was applied to each of the examples and comparative examples, wherein the haze was measured following heat treatment. The quality assessment evaluation system described hereinafter was also used to more clearly distinguish the visual quality of coatings under bright light conditions; properties that are not fully reflected by standard haze values measured in accordance with ASTM D 1003.

The evaluation system considers the more macroscopic effect of visible faults in the coating which cause local colour variations where the coating is damaged or imperfect (hazescan in Table 1). This assessment analyses the light levels in images of heat treated samples taken using fixed lighting conditions and geometries.

To generate the images used to calculate hazescan values, samples are placed inside a black box, 30 cm away from the camera lens. Samples are illuminated using a standard 1200 lumen light with a brightness between 2400 and 2800 Lux, as measured at the samples position. The sample is then photographed using a standard aperture size and exposure length of f5.6 and 1 second with focal length of 105 mm and ISO 400. The greyscale of each pixel in the resulting image is then recorded, with a value of 0 representing black and 255 representing white. Statistical analysis of these values is undertaken to give an overall assessment of the haze of the sample, referred to herein as the hazescan value. The lower the hazescan value recorded, the more superior the results. In general, a hazescan value of less than 90, preferably less than 80 and even more preferably less than 70 is desirable. In some specialist applications, where clarity is prioritised, a hazescan value of less than 60 is desired.

XPS analysis—X-ray photoelectron spectroscopy (XPS) depth profiling was carried out on Thermo K-Alpha XPS using an argon ion etch beam operating at 1 keV (M), producing a beam current of 1.71 A, and rastered over a 2.0×4.0 mm area. A 15 second etch time per level was used with 100 levels of total etching. The X-ray spot size used was 400 µm. The binding energy windows used in the acquisition of the profile were: O1s, C1s, Zn2p, Sn3d, Zr3d, Si2p, Ca2p, Na1s and Mg1s. A survey spectrum (which collects the entire 0-1350 eV binding energy range) was also collected to enable the detection of any additional elements present within the coating. As XPS is a quantitative technique, the concentration of each element within a coating layer may be determined and used to calculate a stoichiometry. For each coating, an average stoichiometry was calculated, based on the average concentration of each element in the layer. The first few etch levels were removed to reduce the influence of surface contamination.

Examples according to the invention incorporating only single silver layers offer excellent colour characteristics, in particular, coatings including only a single silver layer were within the colour box a* −3 to +6.5 and b* −14 to −4 for Rg, and coatings including two or more silver layers were within the colour box a* −6 to 4.8 and b* −18.5 to −2.3 for Rg.

As demonstrated by the examples, the coated glass panes according to the present invention all exhibit good sheet resistance values after deposition, and a negative change in sheet resistance upon heat treatment, indicating that the silver functional layer is adequately protected from damage.

The examples according to the invention exhibit good hazescan values before and after heat treatment, which indicates that the stack combinations are not compromised by heat treatment. The panes of the present invention also show a low level of visible damage according to the tests simulating use, processing and handling conditions for coated glass panes. Furthermore, the panes exhibit high light transmittance and low emissivity and/or good solar control properties, with optical properties remaining stable even after heat treatment.

Surprisingly, coatings according to the present invention exhibit parameters which indicate that they are suitable for applications where toughened panes are required. In particular, hazescan of the examples according to present invention measured following heat treatment was remarkably low, in some cases less than 50.

The invention claimed is:

1. A coated glass pane comprising a glass substrate and a coating, wherein the coating comprises, in sequence from the glass substrate:
    a base layer adjacent to and in contact with the glass substrate;
    a silver-based functional layer; and
    an upper dielectric layer, wherein:
    the base layer comprises an oxide of zirconium and titanium $Zr_xTi_yO_z$; and
    the atomic proportion of Zr based on Zr and Ti in the base layer, calculated as x/(x+y), is from 0.40 to 0.95.

2. A coated glass pane according to claim 1, wherein the atomic proportion of Zr based on Zr and Ti in the base layer, calculated as x/(x+y), is from 0.55 to 0.85.

3. A coated glass pane according to claim 1, wherein the atomic % of titanium in the base layer, calculated as Ti in the total composition, is from 1 to 25.

4. A coated glass pane according to claim 1, wherein the atomic % of oxygen in the base layer, calculated as O in the total composition, is from 60 to 70.

5. A coated glass pane according to claim 1, wherein the atomic % of zirconium in the base layer, calculated as Zr in the total composition, is from 12 to 35.

6. A coated glass pane according to claim 1, wherein the thickness of the base layer in nm is from 6 to 60.

7. A coated glass pane according to claim 1, wherein the Zr factor of the base layer, calculated as the thickness of the base layer in nm multiplied by the atomic proportion of Zr based on Zr and Ti in the base layer, is from 1 to 35.

8. A coated glass pane according to claim 1, wherein the coating further comprises a growth promotion layer between the base layer and the silver-based functional layer, optionally wherein the silver-based functional layer is in direct contact with the growth promotion layer and/or the growth promotion layer is based on an oxide of zinc.

9. A coated glass pane according to claim 8, wherein the growth promotion layer is in direct contact with the base layer.

10. A coated glass pane according to claim 8, wherein the coating further comprises a stabilisation layer between the base layer and the growth promotion layer, optionally wherein the stabilisation layer is in direct contact with the base layer.

11. A coated glass pane according to claim 10, wherein the coating further comprises a separation layer between the stabilisation layer and the growth promotion layer, optionally wherein the separation layer is in direct contact with the stabilisation layer.

12. A coated glass pane according to claim 1, wherein the coating further comprises a barrier layer between the silver-based functional layer and the upper dielectric layer, optionally wherein the barrier layer is in direct contact with the silver-based functional layer.

13. A coated glass pane according to claim 12, wherein the coating further comprises a second silver-based functional layer between the silver-based functional layer and the upper dielectric layer, optionally wherein the coating further comprises a central dielectric layer between the silver-based functional layer and the second silver-based functional layer and/or a second barrier layer between the second silver-based functional layer and the upper dielectric layer.

14. A coated glass pane according to claim 13, wherein the coating further comprises a third silver-based functional layer between the second silver-based functional layer and the upper dielectric layer, optionally wherein the coating further comprises a second central dielectric layer between the second silver-based functional layer and the third silver-based functional layer and/or a third barrier layer between the third silver-based functional layer and the upper dielectric layer.

15. A coated glass pane according to claim 1, wherein the coated glass pane has a Rg a* of from −6 to +6.5 and Rg b* of from −14 to −2.5.

16. A coated glass pane according to claim 1, wherein the sheet resistance Rs is less than 8 $\Omega/\square$.

17. A coated glass pane according to claim 1, wherein the coated glass pane is a heat treatable coated glass pane.

18. A coated glass pane according to claim 1, wherein the coated glass pane is a heat treated coated glass pane, optionally wherein the heat treated coated glass pane is a thermally bent coated glass pane and/or a thermally strengthened coated glass pane.

19. A coated glass pane according to claim 18, wherein the heat treated coated glass pane has a change in colour characteristics AE* compared to a comparable annealed coated glass pane of less than or equal to 3.

20. A coated glass pane according to claim 18, with a haze scan value of less than 90.

21. A coated glass pane according to claim 1, wherein the atomic proportion of Zr based on Zr and Ti in the base layer, calculated as x/(x+y), is from 0.60 to 0.80.

22. A multiple glazing unit comprising a coated glass pane according to claim 1, preferably wherein the multiple glazing unit is a laminated glazing unit and/or an insulated glazing unit.

23. A method of manufacturing a coated glass pane according to claim 1, comprising the steps of:

i) providing a glass substrate;
    ii) providing a base layer;
    iii) providing a silver-based functional layer; and
    iv) providing an upper dielectric layer.

24. A method of manufacturing a coated glass pane according to claim 23, wherein the base layer, and/or the silver-based functional layer, and/or the upper dielectric layer are provided by physical vapour deposition.

* * * * *